3,813,269
METHOD OF MAKING FIBER GLASS THERMOPLASTIC SHEETS

Robert A. Molbert, Akron, Ohio, assignor to The General Tire & Rubber Company
No Drawing. Continuation-in-part of abandoned application Ser. No. 18,027, Feb. 26, 1970. This application July 20, 1972, Ser. No. 273,661
Int. Cl. B44d 1/95
U.S. Cl. 156—272                                    6 Claims

ABSTRACT OF THE DISCLOSURE

Non-uniformity in the distribution of fibers in glass fiber reinforced thermoplastic sheeting has a deteriorating influence upon certain physical properties of the sheeting such as flexural modulus and tensile strength. Non-uniformity is caused by the inability of the viscous thermoplastic melt to penetrate into the fiber mat during manufacture. This invention is a method of making a glass fiber reinforced thermoplastic sheet utilizing powdered thermoplastics and static electricity phenomena to achieve a uniform distribution of fibers.

CROSS-REFERENCE TO RELATED APPLICATION

This application is a continuation-in-part of U.S. patent application Ser. No. 18,027, filed Feb. 26, 1970, now abandoned.

BACKGROUND OF THE INVENTION

Field of the invention

This invention relates to the field of plastic sheeting. More particularly, this invention relates to glass fiber reinforced thermoplastic sheeting and to a method of making it with a uniform fiber distribution throughout.

Description of the prior art

Fiber reinforced thermoplastic sheeting is becoming popular as a substitute for fiber reinforced thermosetting plastic sheeting where a high heat distortion temperature is not required. Among the advantages of fiber reinforced thermoplastic sheeting are its inherently smoother surface, its lower density, and ability to be post-formed. However, the cost advantage of this material over other sheeting has not been fully realized due to the over-design required because of problems stemming from the manufacturing process.

There are a number of known processes for making fiber reinforced thermoplastic sheeting. For instance, it is known to deposit a thin layer of thermoplastic powder on a moving belt, sprinkle a layer of glass fibers thereover, cover with another layer of thermoplastic powder and then compress the three layers under sufficient pressure and heat to liquefy the thermoplastic and form a fully bonded sheet. This form of sheeting contains a center layer having a high fiber/resin ratio and two outer layers having a relatively low fiber/resin ratio; such a structure possesses certain physical properties, such as flexural modulus and tensile strength, inferior to the same sheet where the fibers are uniformly distributed throughout the three layers. This has required the use of two sheets where one sheet would normally be expected to serve as well or the use of extra thick glass mats to increase the already-lagging strength.

The failure of the thermoplastic powder to penetrate the layer of fibers and spread the fibers throughout the sheet is caused by the combination of the high viscosity of the melted thermoplastic and the resistance to melt flow offered by the fibers. Efforts to increase melt penetration by raising pressure on the melt causes a large amount of fiber breakage and orientation of these fibers in the direction of melt flow; both of these have a deteriorating influence on the physical properties of the sheet.

Attempts have been made to make fiber reinforced thermoplastic sheeting by passing a fiber mat through a melt of thermoplastic, however, such efforts have not been able to achieve more uniformity of fiber distribution due to the aforedescribed problems with the flow and resistance of melted thermoplastic and glass fibers.

Probably the most successful manufacturing technique for fiber reinforced thermoplastic sheeting has been to pass a mat of reinforcing fibers through a solution of thermoplastic and solvent and then to drive off the solvent and compress the mat into a sheet. This technique overcomes much of the melt flow problem, however, it is expensive because of the solvents and drying equipment required, and dangerous because of the inherent hazards involved in using solvents.

This invention is a process of making a glass fiber reinforced thermoplastic sheet, wherein the thermoplastic comprises a major amount of polystyrene, utilizing the phenomena of static electric charges to permit penetration of thermoplastic powders into the glass fiber mat so that the final product contains a more uniform distribution of fiber and plastic. The invention is based upon the surprising discovery that polymers selected from the group consisting of polystyrene and polymer mixtures comprising a major amount of polystyrene may be caused to adhere to the fibers in certain glass fiber mats by static electric charge. Such a process involves no solvents and no large, complicated equipment other than the press which is used in all processes to form the sheeting. In addition, the sheeting produced by this method does not exhibit the large degree of broken fibers or fiber orientation, which exists in some of the aforedescribed processes, and is therefore stronger.

Therefore, the main object of this invention is a method of making a glass fiber reinforced thermoplastic sheet, wherein the thermoplastic polymer is selected from the group consisting of polystyrene and polymer mixtures comprising a major amount of polystyrene, that exhibits a uniform distribution of unbroken fibers throughout the sheet. Other objects of this invention include a method that permits adjustment of the fiber to resin ratio while maintaining a uniform distribution of fibers within the sheet, and a method that utilizes both continuous filament and chopped glass strand mats, that is operable with a rather wide choice of thermoplastics and a wide range of particle sizes, and that is amenable to both intermittent and continuous operations.

SUMMARY OF THE INVENTION

This invention concerns a method of making a glass fiber reinforced thermoplastic sheet comprising the steps of obtaining a mat of glass fibers capable of accepting a static electric charge, intimately contacting the mat with particles of a polymer selected from the group consisting of polystyrene and polymer mixtures comprising a major amount of polystyrene, of less than about 20 U.S. Standard Sieve Series mesh, for a time sufficient to permit generation of a static electric charge on the particles and the glass fibers and to cause the particles to impregnate the mat and adhere to the fibers, removing the particles that do not adhere to the fibers, and compressing the particle impregnated mat under heat sufficient to fuse the particles to form the sheet.

DESCRIPTION OF THE PREFERRED EMBODIMENT

This invention pertains to glass fiber reinforced thermoplastic sheets wherein the thermoplastic polymer is selected from the group consisting of polystyrene and polymer mixtures comprising a major amount of polystyrene. Styrene is a well-known aromatic compound having an unsaturated side-chain. It is made by a number of methods such as by the distillation of cinnamic acid, by pyrolysis of natural gases, by condensation of acetylene with benzene at high temperature and reduced pressure; by treating acetophenone with ethyl alcohol on silica gel at high temperatures and, most popularly, by dehydration of ethyl benzene. Styrene is polymerized by many well-known methods. For instance, styrene may be polymerized with a free radical generating catalyst in bulk, solution, emulsion and suspension polymerization systems into the respective forms of crystals, syrups, powders, and beads. Catalysts are used to promote the polymerization such as benzoyl peroxide, lauroyl peroxide, methyl ethyl ketone peroxide, cyclohexanone peroxide, methyl isobutyl ketone peroxide, dicumyl peroxide, azobisisobutyrlnitrile, and the like.

In this invention, the thermoplastic polymer may be either polystyrene or polymer mixtures comprising a major amount of the aforementioned polystyrene. Other materials may be included in the polystyrene or mixture such as stabilizers, lubricants, colorants, and plasticizers, however, these additional materials must exist within the polymeric network and not be merely admixed with the polymer particles. These materials may be placed in the polymeric network by dissolving or dispersing them in the styrene monomer prior to polymerization. If they are placed in the polymeric network then the particles will remain capable of developing static electric charges whereas, if they are merely admixed with the particles, the particles will not develop the charge. The preferred polymer is one consisting essentially of (99% by weight or more) polystyrene; this polymer develops the highest static charge and impregnates the fiber mat the easiest of all other polymers.

Examples of these other materials include compatible polymers such as acrylonitrile, polyphenylene oxide, butadiene, and isobutylene; lubricants such as stearic acid and zinc stearate; colorants such as pigments and dyes; and compatible plasticizers such as phthalates and chlorinated diphenyls. By "major amount" is meant that the polystyrene should exist in quantities greater than about 85% by weight of the compound. When less polystyrene is present, there is a drastic loss in the ability of the particles of polymer mixture to accept a static electric charge. The term "polymer mixture" is used to denote physical mixtures of polystyrene with other polymers as well as copolymers of polystyrene and other polymers. The physical mixtures may be made by melting the separate polymers together, cooling and comminuting the cooled melt or by mixing polystyrene particles with particles of other polymers. All of these aspects are fully contemplated herein under the term "polymer mixture."

The size of the particles should be smaller than about 20 U.S. Standard Sieve Series mesh. The smaller the particle, the greater its ability to impregnate the mat and the easier it adheres to a glass fiber by static electric charge. It has been found that particles ranging from 20–80 mesh are operable herein with the narrower range of 50–80 mesh producing the most desirable degree of penetration and largest amount of pick-up. The particles may either be made in this range of particle size, i.e. less than 20 mesh such as by emulsion or suspension polymerization or larger particles may be comminuted to a size within this range. Suitable grinders for this situation include micropulverizers, ball mills, rod mills, and hammer mills.

The first step in the process of this invention is to obtain a mat of glass fibers capable of accepting a static electric charge. In the field of Fiberglas (mats, rovings, etc.) it is known that all marketed glass fibers are coated with one or more film-forming materials. These materials may be lubricants, protective agents, coupling agents and combinations thereof. Virtually all of these materials are proprietary products and many times the glass fibers are sold without an indication as to what or how much of the agents are coated thereon. A few of these agents prevent the glass fibers from developing a static electric charge, however, these instances are in the distinct minority. By far, most glass fiber mats and roving will develop a static electric charge.

A glass fiber mat or glass roving may be conveniently tested to determine whether or not it will develop a static electric charge by merely placing a small sample of the material in a bag or other container along with a few grams of finely ground polystyrene powder (e.g. 60 to 80 U.S. mesh). The container is closed and shaken for a few minutes and then opened and the glass fibers removed and examined to determine whether the particles adhered to them. Adherance indicates that the fiber will develop a static electric charge. In the event that the fibers do not develop the charge, the glass fiber manufacturer may be contacted for information as to techniques for removing the film-forming agents such as by solvent washing or subjecting the fibers to a reducing flame, etc.

The step of obtaining a mat of glass fibers capable of developing a static charge may thus be accomplished by merely purchasing such a mat either as a continuous filament or as bonded staple fibers. Another way of obtaining the mat of glass fibers is to assemble staple glass fibers, capable of developing a static electric charge, into a layer or mat and then bond them together at their points of contact. This may be conveniently done by sprinkling the chopped roving or staple fibers onto a release surface, such as a glass or polytetrafluoroethylene surface, spraying the mat with a dilute solution of a bonding agent or adhesive that is compatible with polystyrene and then heating the mat to drive off the solvent in the adhesive to cause interbonding of the fibers at their points of contact.

The glass content may vary from eight to fifty-five percent by weight of the total composite. If less than this amount is used the properties of the resulting molding are not satisfactory. If more than fifty-five percent is used molding difficulties are encountered.

Bonding agents operable in this form of the invention comprise plastics and adhesives that are inherently compatible with polystyrene such as polystyrene (in a solvent), alkyd resins, polyisobutylenes, resins, epoxides, and polyesters. These agents should be used in as small of quantities, e.g. 0.1–1.0% (by weight of glass fibers) as possible to preclude them from impairing the development of the static charge on the fibers.

The thickness of the glass fiber mats used in this invention may vary from as thin as 1/8 of an inch to more than two inches. Generally, most mats are made within the range of about 1/8 to 3/4 inches in thickness, however, this invention is intended to utilize thinner and thicker mats. In fact, the thicker mats obtain a greater benefit from this invention because of the better penetration of the particles.

The mat is thereafter intimately contacted with dry particles of polystyrene or a polymer mixture comprising a major amount of polystyrene wherein the particles are less than about 20 U.S. Standard Sieve Series mesh for a time sufficient to generate a static electric charge on the particles and the glass fibers and to cause the particles to impregnate the mat and adhere to the fibers.

The preferred method of intimately contacting the mat and the particles comprises immersing the mat in a fluidized bed of the particles. The vibration of the particles against the fibers, caused by the fluidization, causes a high degree of contact therebetween and permits a static electric charge to be rapidly developed on the fibers and the particles. It has been found that there is a definite relationship between the amount of time the mat is immersed in the bed and the amount of particles that become adhered to the fibers. This method also permits penetration of the particles deep into the mat to produce an even distribution throughout the fibers without causing fiber breakage or orientation.

The term "fluidized bed" is used to indicate a bed or mass of the particles that is fluidized by a vertically rising stream of gas. Most frequently a fluidized bed is constructed of an open-topped container, having an air sparge plate in the base, wherein the container is filled with the particles and the air introduced therein to make the particles separate slightly from each other and behave not unlike a fluid.

Another method of obtaining intimate contact between the mat and the particles is to simultaneously spray the particles onto the mat and vigorously shake the mat. The shaking aids impregnation of the particles into the mat and, in conjunction with the spraying, helps to develop a static electric charge thereon.

The next step in the process is to remove the particles of polymer that do not adhere to the fibers. This is necessary to prevent upsetting of the fiber to resin ratio by inclusion of particles that are mechanically entrapped in the fibers. The removal of the particles may be accomplished in a variety of ways such as by merely shaking or vibrating the mat or by subjecting it to a blast of air. This latter method is most conveniently done in a continuous process. It should be noted that the removed particles of polymer may be reused without further treatment.

The final step in the method, although not necessarily the final step for the product, is to form a finished sheet from the polymer impregnated mat by compressing it under heat sufficient to melt or soften the particles and fuse them together into adherence with the glass fibers to form a uniform, homogeneous thermoplastic sheet. This compression step may be accomplished in a variety of ways such as by compressing the mat between the faces of a press or by compressing the mat between opposed moving belts such as in a continuous process. During compression and heating, the thermoplastic particles will soften to the point where they will flow together and wet the fibers to form a continuous matrix of polymer and fibers.

The heat may be applied by heating the faces of the press or belts, subjecting the pressed material to a blast of hot fluid or air, or a combination of these. Thus, there is formed a monolithic glass fiber reinforced thermoplastic sheet containing a uniform distribution of fibers which may be later subjected in a post-forming operation or used in its as-manufactured state in a wide range of uses and products.

The following examples are presented to give one skilled in the art of molding an indication of how to practice this invention as well as to show some of the limits on the method heretofore described in the specification. Unless otherwise noted, all percentages are percentages by weight and all mesh sizes are U.S. Standard Sieve Series mesh.

EXAMPLE 1

A 6 inch x 8 inch x ¾ inch sample of a bonded, chopped strand glass mat [1] was placed in a plastic bag together with 500 grams of a 100% polystyrene resin (Cosden® 550 [2]). The bag was closed and vigorously shaken for two minutes. The bag was then opened and the mat extracted and shaken to remove the particles that did not adhere to the fibers. The mat was thereafter molded in a press at 350° F. under 10,000 p.s.i. pressure. The mat contained approximately 75% resin and 25% glass and exhibited physical properties listed below in Table 1.

TABLE 1

Physical properties

Heat Distortion Temp. at 264 p.s.i.:
  At 10 mil deflection (° F.) _____ 107
  At 60 mil deflection (° F.) _____ 110
Impact strength—notched Izod, ft. lb./in. notch __ 8.6
Flexural strength, p.s.i. _____ 17,850
Flexural modulus×$10^{-6}$, p.s.i. _____ 0.925
Tensile strength, p.s.i. _____ 9430
Elongation, percent _____ 2

This example shows the basic steps of the process and also shows that the operable particle range lies below 20 mesh.

EXAMPLE 2

Six inch by eight inch sections of different types of glass fiber mats were separately immersed in a fluidized bed containing three different types and particle size ranges of thermoplastic particles, wherein the thermoplastic was either polystyrene or a polymer mixture containing a major amount of polystyrene, and were thereafter processed the same as described in Example 1.

Below in Table 2A and 2B are listed types of glass fiber mats, the types of polymers, their particle size ranges, and an indication as to which of the mats developed a static electric charge.

TABLE 2A.—INDICATION OF GLASS FIBER MATS THAT DEVELOPED A STATIC ELECTRIC CHARGE

| Polymers | Glass fiber mats (type) | | | | | |
|---|---|---|---|---|---|---|
| | AMM [1] | AMM-1 [2] | ACM [3] | M-6800 [4] | MR-2 [5] | 181-112 [6] |
| Cosden® 550 [7] | Yes | Yes | Yes | No | Yes | Yes. |
| HH101 [8] | Yes | Yes | Yes | No | Yes | Yes. |
| Cosden ® 825E [9] | Yes | Yes | Yes | No | Yes | Yes. |

[1,2,3] PPG Industries, Incorporated, Pittsburgh, Pennsylvania.
[4] Owens Corning Fiberglas, Toledo, Ohio.
[5] Gustin Bacon Manufacturing Company, Kansas City, Missouri.
[6] Hess, Goldsmith & Company, Inc., New York, New York.
[7] Cosden Oil & Chemical Company, Big Springs, Texas—100% polystyrene.
[8] Monsanto Company, St. Louis, Missouri—100% polystyrene.
[9] High impact polystyrene (copolymer) containing 90% polystyrene 10% butadiene, Cosden Oil & Chemical Company, Big Springs, Texas.

TABLE 2B.—PARTICLE SIZE ANALYSIS OF POLYMERS, PERCENT RETAINED

| Mesh | Cosden 550 [7] | Cosden 825E [9] | Monsanto HH101 [8] |
|---|---|---|---|
| 20 | | | 30 |
| 30 | | | 35 |
| 50 | 75 | 70 | 34 |
| 70 | 17 | 20 | |
| 80 | 4 | 5 | |
| >50 | | | 1 |
| >80 | 4 | 5 | |

[7,8,9] See footnotes bottom of Table 2A.

This example shows that polystyrene and polymer mixtures comprising at least 85% polystyrene are operable herein as well as indicating the types of glass fiber mats that are usable herein.

EXAMPLE 3

Six inch by eight inch samples of a chopped glass strand mat (PPG Industries, Incorporated-Type AMM) were immersed in a fluidized bed containing polystyrene powder (Cosden® 550) for varying lengths of time. Below in Table 3 is listed the number of minutes each ---
[1] Type AMM, PPG Industries, Incorporated, Pittsburgh, Pa.
[2] Cosden Oil and Chemical Company, Big Springs, Tex., partial size analysis 75% retained on 50 mesh, 16% retained on 70 mesh, 4% retained on 80 mesh, and 5% smaller than 80 mesh-100% polystyrene.

sample was immersed in the fluidized bed and the corresponding percentages of resin picked-up in the mat.

TABLE 3

| Minutes: | Percent resin pick-up in mat |
|---|---|
| 1 | 46 |
| 2 | 58 |
| 3 | 50 |
| 4 | 60 |
| 5 | 77 |

This example shows that there is a relationship between the time of contact of the mat and the particles and the development of a static electric charge thereon giving rise to a varying amount of polymer pick-up in the mat.

What is claimed is:

1. A method of making a glass fiber reinforced thermoplastic sheet comprising the steps of:
   (a) intimately contacting a preformed impregnable mat of glass fibers capable of accepting a static electric charge with polymer particles selected from the group consisting essentially of
      (1) polystyrene, and
      (2) polymers of at least 85% by weight of styrene and one or more copolymerizable monomers said polymer particles having a particle size not greater than about 20 mesh U.S. Standard Sieve Series
   (b) causing a static electric charge to develop between said particles and said mat as a result of said contact whereby said particles impregnate said mat and adhere to said glass fibers
   (c) removing any polymer particles not adhering to said glass fibers
   (d) fusing then compressing said particles under heat to form a monolithic glass fiber reinforced sheet wherein the glass fibers constitute between eight and fifty-five percent by weight of said sheet.

2. The method of claim 1 wherein the step of intimately contacting said mat with said polymer particles comprises immersing said mat in a fluidized bed of said polymer particles.

3. The method of claim 1 wherein the step of contacting said mat with said polymer particles comprises causing a shaking relationship between said mat and a mass of said particles.

4. The method of claim 1 wherein said polymer particles have a particle size ranging from about 50 to 80 mesh U.S. Standard Sieve Series.

5. The method of claim 2 wherein said polymer particles have a particle size ranging from about 50 to 80 mesh U.S. Standard Sieve Series.

6. The method of claim 3 wherein said polymer particles have a particle size ranging from about 50 to 80 mesh U.S. Standard Sieve Series.

References Cited
UNITED STATES PATENTS

| 2,998,048 | 8/1961 | Sittel | 264—24 |
| 2,998,051 | 8/1961 | Sittel | 264—24 |
| 3,426,108 | 2/1969 | Britten | 264—24 X |

EDWARD G. WHITBY, Primary Examiner

U.S. Cl. X.R.

117—17, 21, 26, Dig. 6; 156—279; 264—24, 126